W. N. SPRINGER.
COUPLED VEHICLE.
APPLICATION FILED OCT. 10, 1908. RENEWED MAY 16, 1916.
1,209,774.
Patented Dec. 26, 1916.
4 SHEETS—SHEET 3.
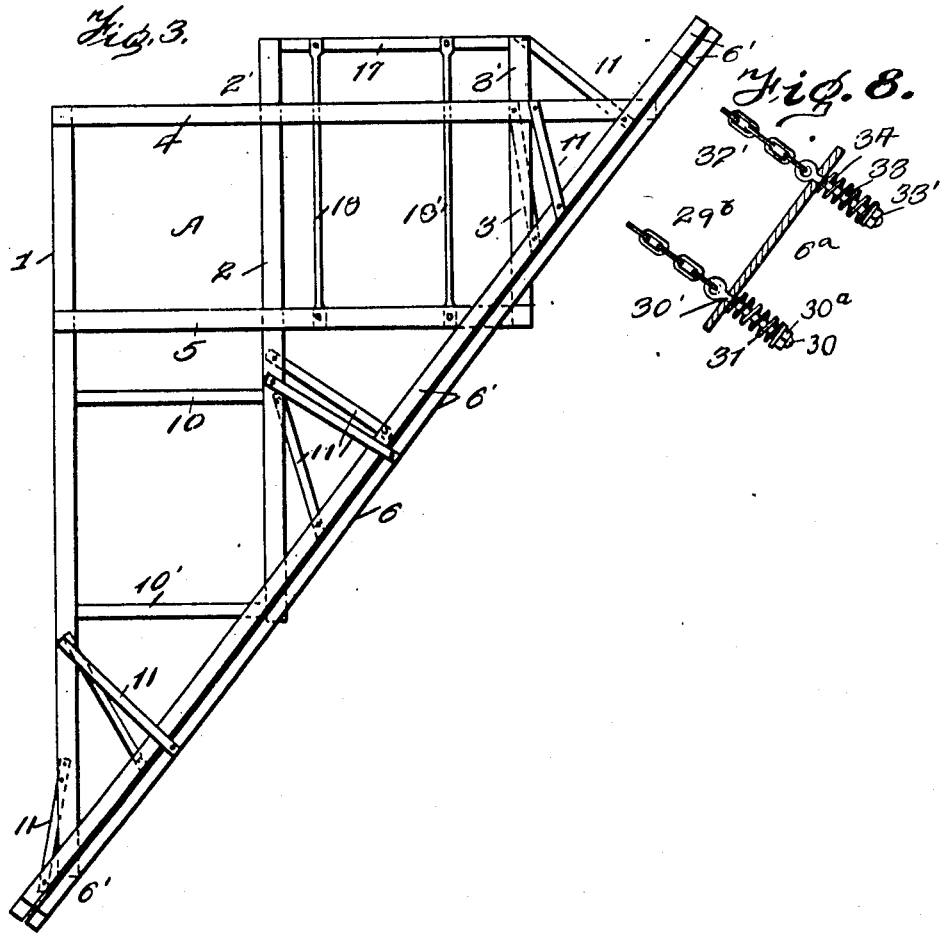

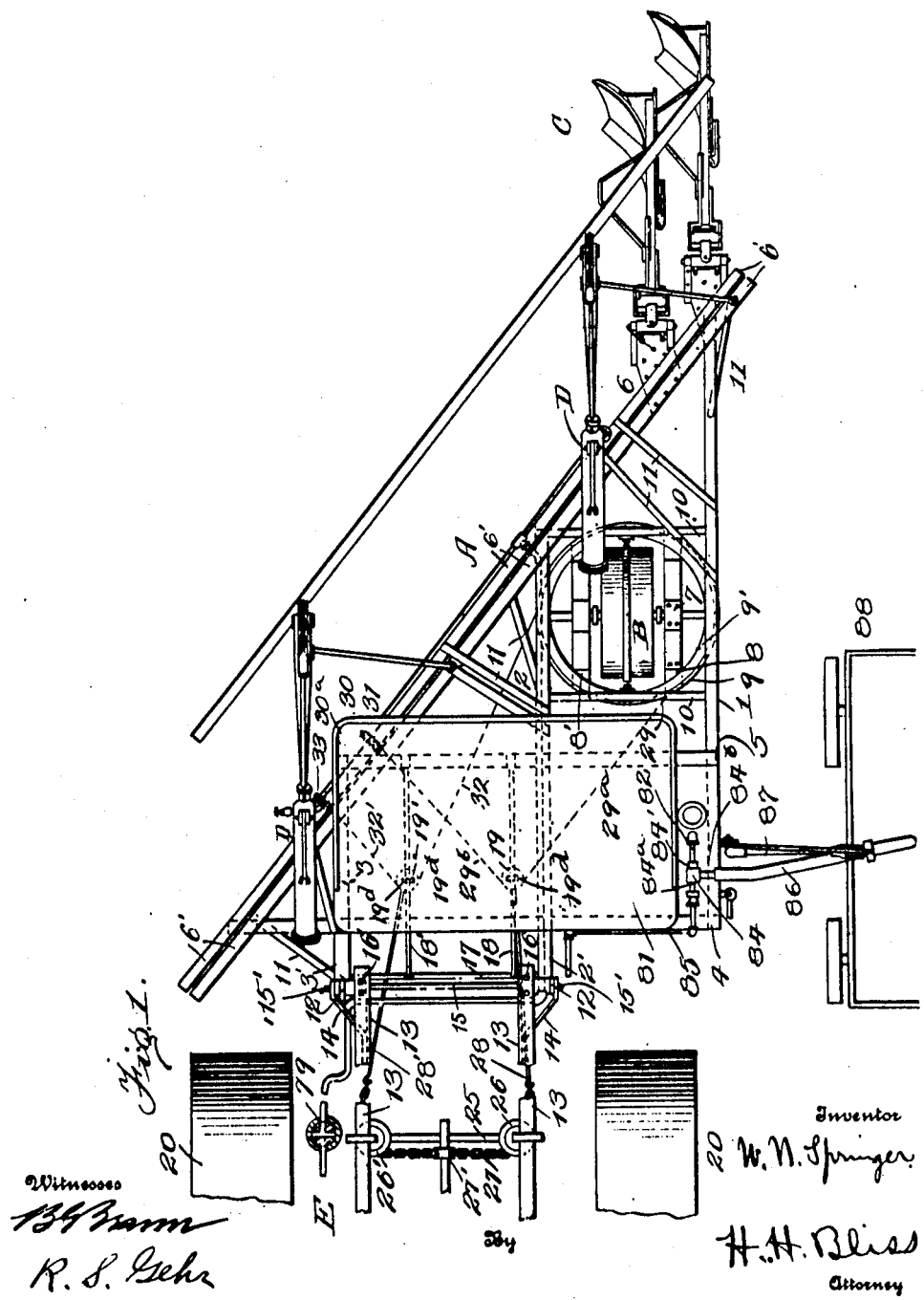

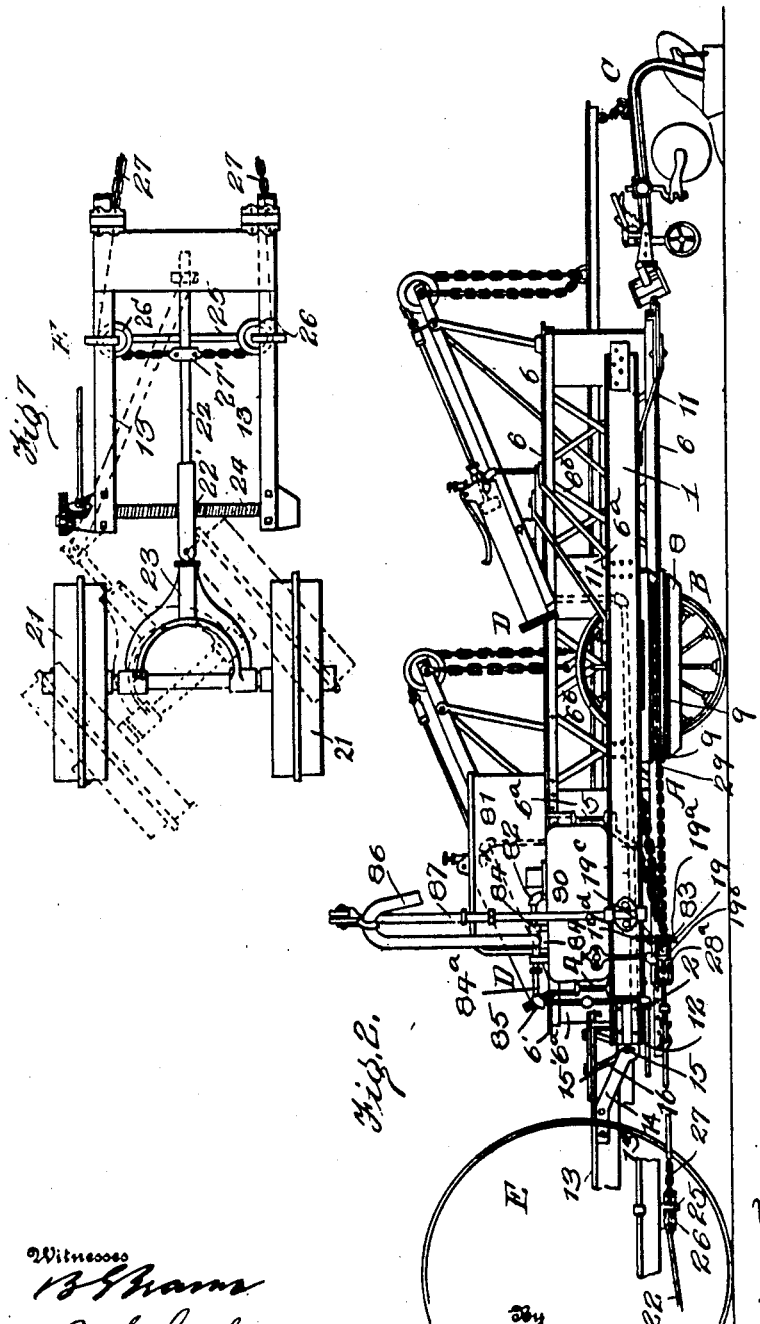

W. N. SPRINGER.
COUPLED VEHICLE.
APPLICATION FILED OCT. 10, 1908. RENEWED MAY 15, 1916.
1,209,774.
Patented Dec. 26, 1916.
4 SHEETS—SHEET 4.
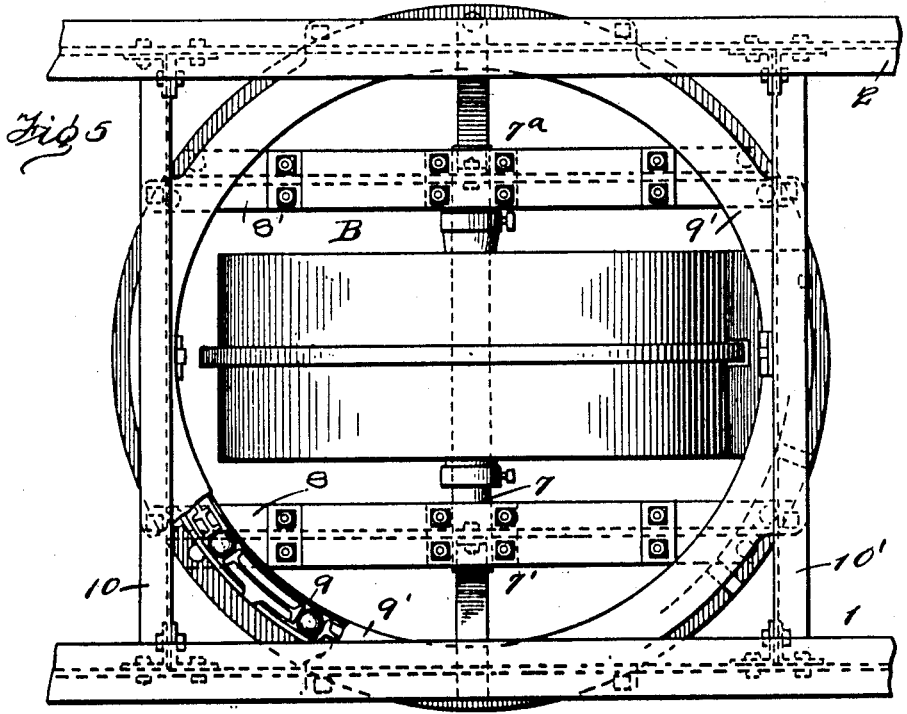
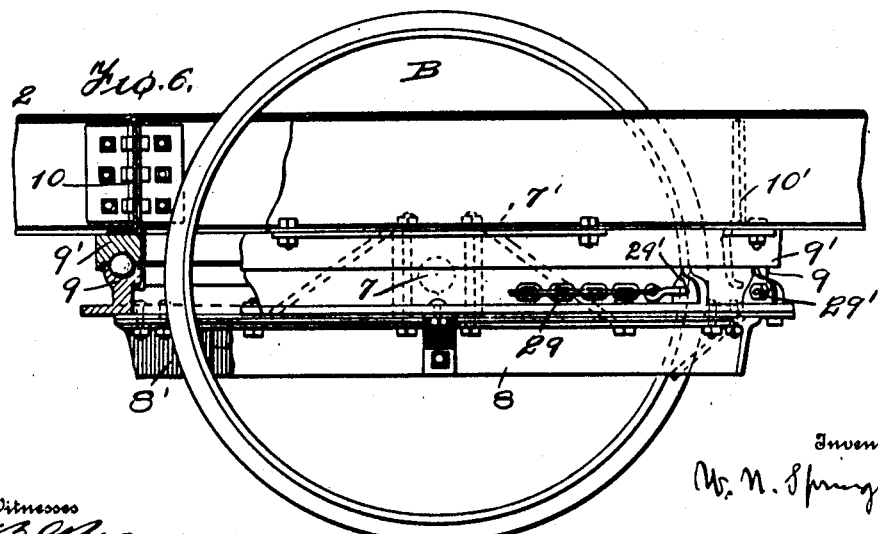
Witnesses
Inventor
W. N. Springer
By
H. H. Bliss
Attorney

UNITED STATES PATENT OFFICE.

WILLIAM N. SPRINGER, OF PEORIA, ILLINOIS, ASSIGNOR TO AVERY COMPANY, A CORPORATION OF ILLINOIS.

COUPLED VEHICLE.

1,209,774.  Specification of Letters Patent.  Patented Dec. 26, 1916.

Original application filed March 8, 1906, Serial No. 304,855. Divided and this application filed October 10, 1908, Serial No. 457,115. Renewed May 16, 1916. Serial No. 97,962.

*To all whom it may concern:*

Be it known that I, WILLIAM N. SPRINGER, a citizen of the United States, residing at Peoria, in the county of Peoria and State of Illinois, have invented certain new and useful Improvements in Coupled Vehicles, of which the following is a specification, reference being had therein to the accompanying drawing.

The invention relates to improvements in coupled vehicles such as a traction engine and a gang plow frame, tender, or the like, coupled thereto.

One object of the invention is the provision of improved steering mechanism for the two vehicles, the steering mechanism of the tractor and that of the trailing vehicle being constructed in such a manner and connected with each other in such a manner that the two mechanisms are actuated in unison to effectively guide the trailing vehicle in the path of the tractor, and undue stresses in and sudden shocks to the steering apparatus incident to passage over rough surfaces are obviated.

My improvements are especially useful in connection with engine drawn gang plows, and, in the illustrative embodiment of the invention shown in the accompanying drawings, the trailing vehicle is the main frame of a gang plow.

Figure 1 is a top plan view of a plow frame and of a portion of a traction engine to which the frame is coupled. Fig. 2 is a side elevation of the same. Fig. 3 is a plan view of the gang-plow frame. Fig. 4 is a rear end view of the same. Fig. 5 shows the steering wheel for the gang-plow frame and its mounting detached. Fig. 6 is a side elevation of the steering wheel and frame parts, shown in Fig. 5, a portion of the frame and bearing structure being broken away and shown in section. Fig. 7 is a diagrammatic view of a part of the steering mechanism for controlling said wheel which is arranged both on the tractor and the gang-plow frame. Fig. 8 is an enlarged detail view of the anchors or fastening devices of the steering chains.

In the drawings, A indicates as an entirety, the framework of the gang-plow, B the steering wheel upon which it is mounted, C the gang of plows connected thereto, and D the motors carried by the said frame and arranged to control the elevation from and lowering to working position of the plows.

E indicates the tractor in the form of a traction engine of which only portions of the front steering wheels and steering mechanism, the rear traction wheels, and the frame are shown.

The frame A of the gang-plow is preferably triangular in shape and comprises longitudinally arranged horizontal beams or bars 1, 2, and 3, transverse beams or bars 4 and 5 supported on said longitudinal bars, and a diagonally arranged I-beam or gang-plow-beam 6. All of these beams are rigidly secured together in any suitable and well known manner. The gang-plow-beam 6 is preferably, for the sake of lightness and consistent strength, a skeleton beam built up of angle plates 6', 6' at top and bottom, connected at intervals by plates 6ᵃ and suitable braces 6ᵇ.

The steering wheel B is arranged in a supplemental frame in the angle between the longitudinal beam 1 and the diagonal gang-plow-beam 6, in such manner as to be on the left hand side of the frame and near the rear end thereof. The wheel is rigidly secured to an axle 7 mounted transversely in the bearings 7', 7ᵃ carried by the beams 8, 8', respectively, which also carry the lower ball race 9 of a ball bearing, the upper ball race 9' of which is carried by the transverse bars 10, 10', secured in position between the longitudinal beams 1 and 2.

11 are supporting and bracing rods, each connected at one end to the gang-plow-beam 6 either at the top or bottom thereof, and at its other end to one of the longitudinal beams of the frame correspondingly either at the top or bottom thereof.

The longitudinal beams 2 and 3 preferably extend forward beyond the top transverse beam 4, as indicated at 2', 3', respectively, and at their front ends carry bearing or pivot blocks 12, 12, which serve as part of the means by which the gang-plow-frame is connected to the tractor or engine frame. The latter is indicated by 13, and as shown, when the frames are connected together overlaps the front end of the gang-plow-frame.

14, 14, are connection brackets secured at their front ends to the tractor frame and having their rear ends adapted to lie adjacent to the bearing blocks 12, 12. 15 is a rod or shaft extending through the rear ends of said connection brackets and the bearing blocks 12, 12, and held in position by pins 15', 15' at either end, which may be suitably locked to prevent their detachment except when desired.

16, 16', are suitable hangers or supports for the shaft 15 suspended from the rear end of the tractor frame.

17 is a bar or rod connecting the beams 2 and 3 together near their front ends.

18, 18', are rods or bars, each secured at its rear end to the under surface of the I-beam 5 and at its front end to the cross bar 17.

19, 19', are horizontally arranged guide sheaves mounted on pivot pins 19ª carried by the swinging arms or sheave frames 19ᵇ. The pivot pins at their upper ends carry eyes 19ᶜ which are suspended by links 19ᵈ from the rods 18 and 18', the said links permitting longitudinal movement of the sheaves 19, 19' relative to their respective supporting rods 18, 18'. The sheave frames 19ᵇ are connected to the steering mechanism for the steering wheels of the tractor in any suitable manner according to the nature of the said mechanism. For illustration, I have shown the tractor E as having the traction wheels 20, 20, supporting the rear end of the engine frame 13, and the steering wheels 21, 21, supporting the front end thereof. These steering wheels are turned in either direction about a pivotal point central between them by means of a swinging rod 22 pivotally connected to a yoke 23 connected with the steering axle. The swinging bar 22 may be caused to swing in both directions between certain limits by means of a threaded connection 22' with a power-driven screw rod 24, this particular steering mechanism being set forth and described in detail in my Patent 842,589, dated January 29, 1907. The screw thread mechanism is nonoverhauling and in operation holds the wheels 21 unyieldingly in any position to which they are turned.

25 is a cross bar connected at either end to the adjacent frame bar of the tractor. 26, 26' are horizontally arranged sheaves pivotally connected to and supported by said cross bar 25.

27 is a steering chain extending around and guided by the sheaves 26, 26', and connected at 27' with the swinging bar 22 of the steering mechanism for the steering wheels of the tractor.

28, 28' are rods each connected at its forward end to the adjacent end of the chain 27 and at their rear end by universal joints 28ª to the adjacent sheave-carrying frames 19ᵇ.

29 is a steering chain or cable for positively rotating the steering wheel B of the gang-plow-frame in both directions. This chain extends around the said wheel and is rigidly secured at 29' to the rotatable frame which carries the wheel. From the left side of this frame the chain extends in a line as indicated at 29ª, to the guide sheave 19 around which it is carried and from which it extends in a line 29ᵇ. Its end is secured to one end of a bolt 30 which is free to move through an aperture 30' in one of the vertical connecting plates of the diagonal gang-plow-beam 6. 31 is a spring encircling said bolt and interposed between the said plate and a nut 30ª adjustable along the bolt. From the opposite side of the rotatable carrying frame of the steering wheel the chain extends along a line 32 to the guide sheave 19' around which it is directed and from which it extends along the line 32' to a bolt 33, to one end of which it is connected and which is likewise supported in one of the connecting plates in the I-beam 6 and is free to move laterally therethrough. 34 is a spring encircling said bolt and interposed between said plate and a nut 33' adjustable along said bolt.

The drawings show individual plows coupled to the diagonal beam of the main frame and mechanism for raising and lowering the plows but as the plows proper and the said mechanism constitute no part of the invention claimed in this application they need not be described.

80 is a water tank secured in position upon the plow frame and adapted to carry water for the tractor. 81 is a fuel box likewise suitably secured upon the plow frame and adapted to carry fuel for the tractor.

82 is an inlet pipe for conducting water into the water tank 80 and 83 is an outlet pipe for drawing it off to the tractor. I have found it highly desirable to provide some means for filling the water tank 80 with water while the plow frame is traveling along in operation. To this end, the inlet pipe 82 is connected to one arm 84' of a T-coupling 84, the other arm 84ª of which, in alinement with the arm 84', is connected to a steam supply pipe or jet 85 communicating with a steam supply line on the tractor. The arm 84ᵇ is connected with a flexible hose 86 supported and carried by a swinging frame or crane 87 in such manner that the free end of the hose may be inserted in a water tank on a water cart indicated by 88, and as the cart moves along parallel with the plow frame, water may be drawn from the tank thereon into the tank 80. The steam jet 85 will direct steam into the arm 84' of the coupling 84 in such way as to create a suction or siphonic action in the hose 86.

The operation of the mechanism will be readily understood. When the plow frame is connected to the tractor frame by the coupling pivot or rod 15 and the steering rods 28, 28' are connected to the sheave frames 19$^b$, 19$^b$, if power is applied for driving the tractor, the triangular plow frame will move with it wherever it goes, and in accordance with the turning of the steering of the steering wheels of the tractor the rods 28, 28' will act upon the steering chain 29 for the steering wheel B of the plow frame in such manner as to cause the said frame to track properly behind the tractor. For example, referring to Fig. 7, if the steering wheels are turned so as to cause the tractor to turn to the right, the rod 28' on the right hand side of the tractor will exert a pull on the chain 32 so as to turn the axle of the steering wheel B in anti-clockwise direction, that is to the left, and this makes it possible and easy for the plow frame to swing in unison with the frame of the tractor, as the latter turns. If the steering wheels are turned so as to cause the tractor to turn to the left, the steering wheel B will be turned in clockwise direction, that is to the right, so as to make the plow frame track properly. The springs 31 and 34 provide the necessary resiliency in the steering mechanism between the tractor and the plow frame to prevent unnecessary straining of the chains, rods, and connections, and to take up any sudden jerks or shocks imparted either from the steering wheels of the tractor or the steering wheel and supporting wheel B of the plow frame.

In this application I claim only those features of my invention which involve the tractor, or parts thereof, in combination with the plow mechanism, or parts thereof, other features of my invention being claimed in my application filed March 8, 1906, Ser. No. 304,855, of which this application is a division.

What I claim is:—

1. The combination of a tractor having drive wheels and steering wheels, a trailing vehicle having a main frame flexibly coupled to the tractor, a supporting and steering wheel for said frame turnable about a vertical axis, a non-yielding steering mechanism for angling the steering wheels of the tractor, a train of power transmitting elements interposed between said steering mechanism for the tractor wheels and the steering wheel of the trailing vehicle, and a resilient abutment which is secured against relative bodily movement and which connects one of the elements of the said train with a relatively stationary part.

2. The combination of a tractor having driving wheels and steering wheels, a trailing vehicle having a main frame flexibly coupled to the tractor, a supporting and steering wheel for said main frame, a frame for the said wheel turnable relative to the main frame about a vertical axis, two lines of steering chain connected to said steering wheel frame and extending from opposite sides thereof, each line of chain having its extended end secured by a yieldable connection to said main frame, and flexible connections between the steering wheels of the tractor and each of said lines of steering chain.

3. The combination of a tractor having driving wheels and steering wheels, a trailing vehicle having a main frame flexibly coupled to the tractor, a supporting and steering wheel for said main frame, a horizontally rotatable frame in which said steering wheel is mounted, a chain extending around said wheel-carrying frame and having the ends of its lines leading from opposite sides thereof connected to the main frame, a horizontally swingable bar connected to the steering wheels of the tractor, and means connecting said bar with both lines of the steering chain extending from either side of said rotatable steering wheel frame to the main frame.

4. The combination of a tractor having drive wheels and steering wheels, a trailing vehicle having a main frame flexibly coupled to the tractor, a horizontally rotatable steering wheel frame, a ball bearing mounted between said steering wheel frame and said main frame, a supporting and steering wheel for the main frame mounted in said rotatable frame, a steering chain secured to said steering wheel frame and having lines extending from either side of said frame and secured to the main frame, and means connecting the steering wheels of the tractor with the said lines of chain which extend from opposite sides of the said steering frame to the said main frame.

5. The combination of a tractor having drive wheels and steering wheels, a trailing vehicle having a main frame flexibly coupled to the tractor, a supporting and steering wheel for said main frame, a frame for the said wheel turnable relative to the main frame about a vertical axis, two lines of steering chain connected to said steering wheel frame and extending from opposite sides thereof, each line of chain having its extended end secured by a yieldable connection to said main frame, a horizontally swingable bar connected to the steering wheels of the tractor, and flexible connections leading from said horizontally swingable bar to each of said lines of steering chain on the main frame of the trailing vehicle.

In testimony whereof I affix my signature, in presence of two witnesses.

WILLIAM N. SPRINGER.

Witnesses:
  A. L. GREGORY,
  GEO. T. KLEIN.

Copies of this patent may be obtained for five cents each, by addressing the "Commissioner of Patents, Washington, D. C."